US007456730B2

(12) United States Patent
Yamada et al.

(10) Patent No.: US 7,456,730 B2
(45) Date of Patent: Nov. 25, 2008

(54) ANOMALY JUDGMENT SYSTEM FOR OPERATOR DETECTION DEVICE AND PROCESS FOR JUDGING NORMALITY/ANOMALY OF OPERATOR DETECTION DEVICE

(75) Inventors: Kazutoshi Yamada, Kariya (JP); Kenji Suga, Kariya (JP); Toshikazu Kamiya, Kariya (JP); Tadashi Yamada, Kariya (JP); Toshinari Fukatsu, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 575 days.

(21) Appl. No.: 11/302,588

(22) Filed: Dec. 13, 2005

(65) Prior Publication Data

US 2006/0139179 A1 Jun. 29, 2006

(30) Foreign Application Priority Data

Dec. 14, 2004 (JP) ............................ 2004-360807

(51) Int. Cl.
*B60Q 1/00* (2006.01)

(52) U.S. Cl. .................. 340/425.5; 340/426.3; 340/667

(58) Field of Classification Search ............. 340/425.5, 340/426.3, 667
See application file for complete search history.

(56) References Cited

U.S. PATENT DOCUMENTS

| | | | | |
|---|---|---|---|---|
| 6,489,889 | B1 | 12/2002 | Smith | 340/457 |
| 6,922,622 | B2 * | 7/2005 | Dulin et al. | 340/438 |
| 6,946,978 | B2 * | 9/2005 | Schofield | 340/995.28 |
| 2004/0075569 | A1 | 4/2004 | Ohtaka | 340/667 |
| 2004/0099233 | A1 | 5/2004 | Fujimoto et al. | 123/142.5 |

FOREIGN PATENT DOCUMENTS

| | | |
|---|---|---|
| DE | 102 16 547 | 10/2002 |
| EP | 1 481 853 A2 | 12/2004 |
| JP | 2004-176570 | 6/2004 |

* cited by examiner

*Primary Examiner*—George A Bugg
*Assistant Examiner*—Samuel J Walk
(74) *Attorney, Agent, or Firm*—Morgan & Finnegan, LLP

(57) ABSTRACT

An anomaly judgment system includes an actuating switch and an anomaly judgment unit for judging anomaly of an operator detection device that is turned into an ON state when detecting an operator in a vehicle. The actuating switch is operable to be turned into an ON state by the operator. The anomaly judgment unit judges the operator detection device as anomalous when a time period during which the actuating switch is in an OFF state with the operator detection device in the ON state exceeds a predetermined time period.

19 Claims, 9 Drawing Sheets

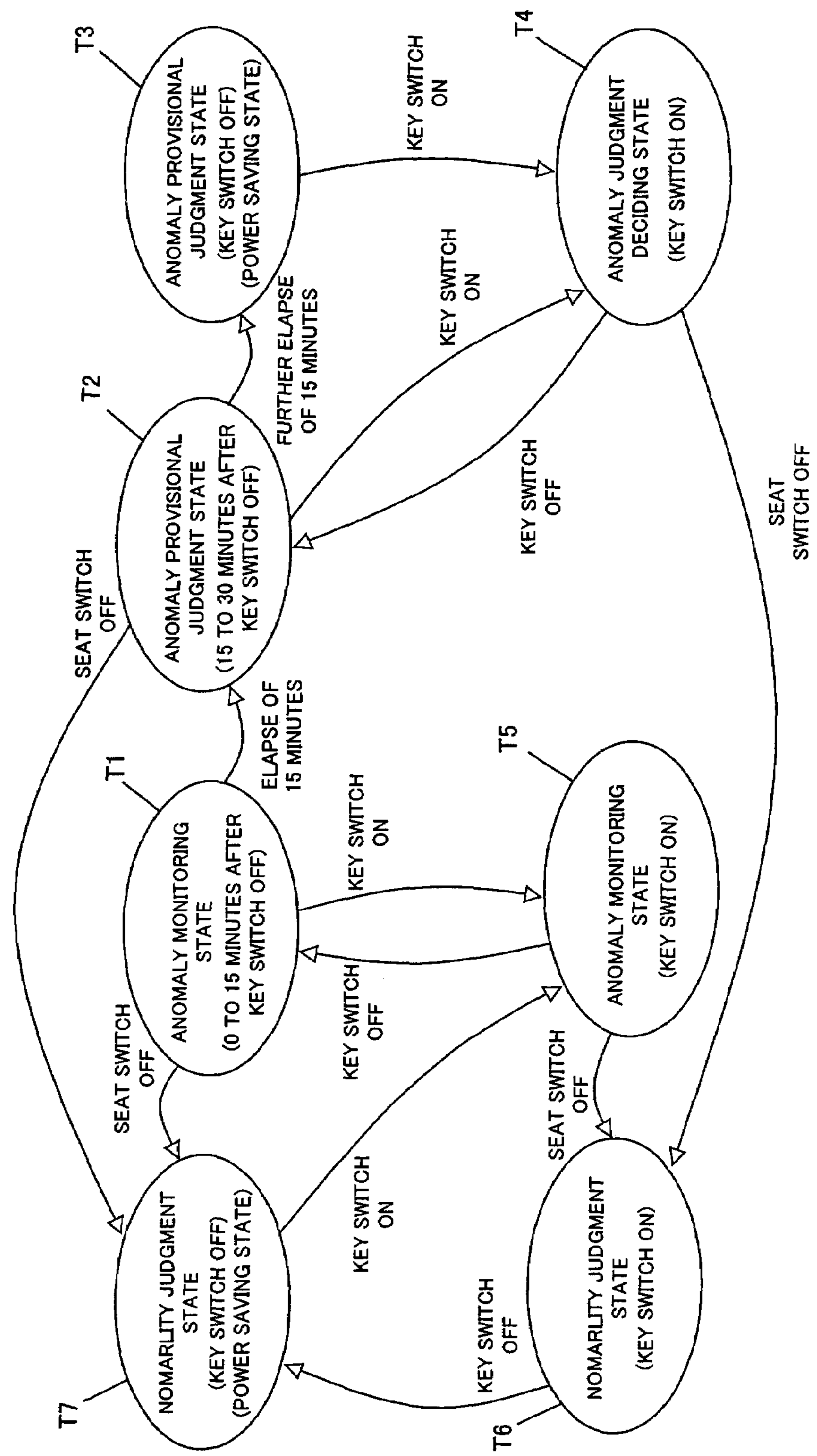

FIG. 2
T1
ANOMALY MONITORING STATE (0 TO 15 MINUTES AFTER KEY SWITCH OFF)
T2
ANOMALY PROVISIONAL JUDGMENT STATE (15 TO 30 MINUTES AFTER KEY SWITCH OFF)
T3
ANOMALY PROVISIONAL JUDGMENT STATE (KEY SWITCH OFF) (POWER SAVING STATE)
T4
ANOMALY JUDGMENT DECIDING STATE (KEY SWITCH ON)
T5
ANOMALY MONITORING STATE (KEY SWITCH ON)
T6
NOMARLITY JUDGMENT STATE (KEY SWITCH ON)
T7
NOMARLITY JUDGMENT STATE (KEY SWITCH OFF) (POWER SAVING STATE)
ELAPSE OF 15 MINUTES
FURTHER ELAPSE OF 15 MINUTES
KEY SWITCH ON
KEY SWITCH ON
KEY SWITCH OFF
KEY SWITCH ON
KEY SWITCH OFF
KEY SWITCH ON
KEY SWITCH OFF
SEAT SWITCH OFF
SEAT SWITCH OFF
SEAT SWITCH OFF
SEAT SWITCH OFF

ANOMALY JUDGMENT SYSTEM FOR OPERATOR DETECTION DEVICE AND PROCESS FOR JUDGING NORMALITY/ANOMALY OF OPERATOR DETECTION DEVICE

BACKGROUND OF THE INVENTION

The present invention relates to an anomaly judgment system for an operator detection device, more particularly to a system that judges normality/anomaly of an operator detection device in an industrial vehicle.

Unexamined Japanese Patent Publication No. 2004-176570 discloses an anomaly diagnosis system that diagnoses the anomaly of a seat switch as an operator detection device which is disposed in an operator's seat. The seat switch is provided for executing warming-up of an element related to an engine prior to start of the engine. Based on turning the seat switch from an OFF state into an ON state, it is detected that the operator is seated, thereby to determine that the engine will be started soon. When an OFF signal is not obtained from the seat switch in spite of determining that the operator gets off the vehicle, the anomaly of the seat switch is detected. Additionally, when the anomaly state continues for a predetermined time period after the detection of the anomaly, the seat switch is diagnosed as final anomaly.

It is determined that the operator gets off the vehicle when confirming all of the following facts; that an ignition switch is in an OFF position; that an ignition key is drawn from an ignition insertion switch; that a door is opened and closed; and that door-lock is executed from an outside of the vehicle. Input of information on the above facts is required. Namely, in order to determine that the operator gets off the vehicle, it is required to respectively determine whether the ignition switch is in the OFF position, whether the ignition key is drawn from the ignition insertion switch, whether the door is opened and closed, and whether the door-lock is executed from an outside of the vehicle. Thus, the diagnosis system is made complicated and diagnosis logic is made complicated.

The anomaly of the seat switch is detected only when it is determined that the operator gets off the vehicle. Additionally, the seat switch is diagnosed as final anomaly when the anomaly state continues for a predetermined time period after the detection of the anomaly. However, when it is misjudged that the operator gets off the vehicle and the operator is actually seated for the predetermined time period or more, even though the seat switch actually works in a normal manner, the seat switch is diagnosed as final anomaly.

The present invention is directed to an anomaly judgment system for an operator detection device which precisely judges anomaly of the operator detection device with a simple structure.

SUMMARY OF THE INVENTION

According to the present invention, an anomaly judgment system includes an actuating switch and an anomaly judgment unit for judging anomaly of an operator detection device that is turned into an ON state when detecting an operator in a vehicle. The actuating switch is operable to be turned into an ON state by the operator. The anomaly judgment unit judges the operator detection device as anomalous when a time period during which the actuating switch is in an OFF state with the operator detection device in the ON state exceeds a predetermined time period.

The present invention also provides a process for judging normality/anomaly of an operator detection device that is turned into an ON state when detecting an operator in a vehicle that includes an actuating switch operable to be turned into an ON state by the operator. The process comprising the steps of; detecting the ON state of the operator detection device; judging whether the operator detection device is turned into an OFF state; judging whether the actuating switch is turned into the ON state; judging whether a predetermined time period elapses without turning the operator detection device into the OFF state and without turning the actuating switch into an ON state since the detection of the ON state of the operator detection device; and judging the operator detection device as anomalous after the elapse of the predetermined time period.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is a state transition diagram showing the operation of the anomaly judgment system according to the first preferred embodiment;

DETAILED DESCRIPTION OF THE PREFERRED EMBODIMENTS

Figure 1:
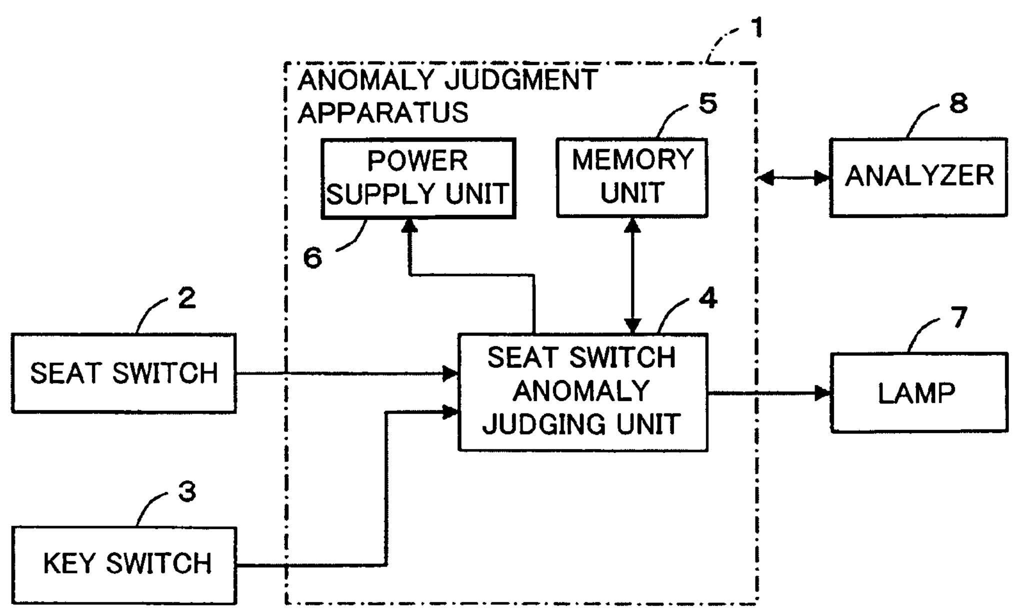
FIG. 1 is a block diagram of an anomaly judgment system for an operator detection device according to a first preferred embodiment.
Figure 3:
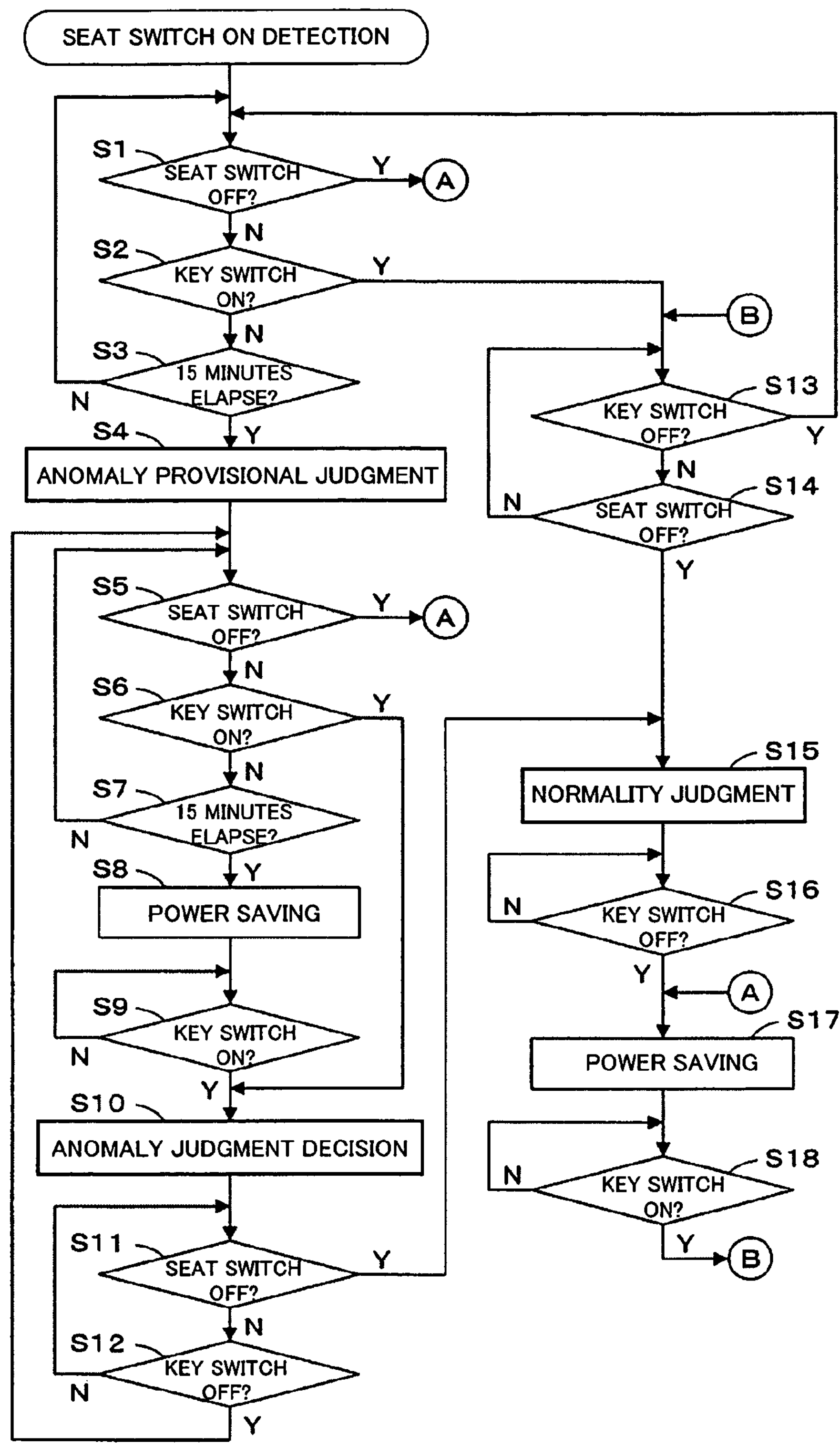
FIG. 3 is a flowchart diagram showing the operation of the anomaly judgment system according to the first preferred embodiment.

The following will describe a first preferred embodiment of the present invention with reference to FIGS. 1 through 3. FIG. 1 shows a construction of an anomaly judgment system for an operator detection device in use for an industrial vehicle such as forklift truck. The anomaly judgment system includes an anomaly judgment apparatus 1 to which a seat switch 2 and a key switch 3 are connected. The seat switch 2 is disposed in an operator's seat of the industrial vehicle. The seat switch 2 is turned into an ON state when an operator is seated while it is turned into an OFF state when the operator leaves the operator's seat. The seat switch 2 is an operator detection device of the present invention. The key switch 3 is operable to be turned into an ON state by the operator for starting the vehicle. The key switch 3 is an actuating switch of the present invention.

The anomaly judgment apparatus 1 includes an seat switch anomaly judgment unit 4 to which the seat switch 2 and the key switch 3 are connected, a memory unit 5 for storing information therein, and a power supply unit 6 for supplying electric power to the seat switch anomaly judgment unit 4. The seat switch anomaly judgment unit 4 judges normality/anomaly of the seat switch 2 based on ON/OFF state of the seat switch 2 and ON/OFF state of the key switch 3.

The anomaly judgment system includes a lamp 7 as a notifying means of the present invention and an analyzer 8. The lamp 7 is disposed at the operator's seat and connected to the seat switch anomaly judgment unit 4. The analyzer 8 is connected to the anomaly judgment apparatus 1 for confirming and deleting contents stored in the memory unit 5.

The following will describe the operation of the anomaly judgment system with reference to FIGS. 2 and 3 showing a state transition diagram and a flowchart diagram, respectively. When detecting the ON state of the seat switch 2, the seat switch anomaly judgment unit 4 shifts into an anomaly monitoring state T1 as shown in FIG. 2. At step S1, it is judged whether the seat switch 2 is turned into the OFF state. When the seat switch 2 is not turned into the OFF state, the process proceeds to step S2 where it is judged whether the key switch 3 is turned into the ON state. When the key switch 3 is not turned into the ON state, the process proceeds to step S3 where it is judged whether fifteen minutes elapse since the detection of the ON state of the seat switch. Until it is judged that fifteen minutes elapses at step S3, steps S1 and S2 are repeated.

When fifteen minutes elapse without turning the seat switch 2 into the OFF state and without turning the key switch 3 into the ON state, it is judged that the a time period during which the key switch 3 is not operated even though the operator is seated on the operator's seat is overlong. It is judged that the operator is actually not seated but the seat switch 2 is turned into the ON state. At step S4, the seat switch anomaly judgment unit 4 shifts into an anomaly provisional judgment state T2 and it is judged that the seat switch 2 is anomalous. Then, the process proceeds to step S5 where it is judged whether the seat switch 2 is turned into the OFF state. When the seat switch 2 is not turned into the OFF state, the process proceeds to step S6 where it is judged whether the key switch 3 is turned into the ON state. When the key switch 3 is not turned into the ON state, the process proceeds to step S7 where it is judged whether fifteen minutes elapse since the elapse of the fifteen minutes at step S3. Until it is judged that fifteen minutes elapse at step S7, steps S5 and S6 are repeated.

When fifteen minutes elapse at step S7, namely when thirty minutes elapse without turning the seat switch 2 into the OFF state and without turning the key switch 3 into the ON state, the process proceeds to step S8 where the seat switch anomaly judgment unit 4 shifts into a power saving state T3 to stop operator detection by the seat switch 2 while judging the seat switch 2 as anomalous. At this state, since the key switch 3 is not turned into the ON state, there is no electric supply from a generator. However, the operator detection by the seat switch 2 is stopped, thereby to reduce energy consumption.

The process proceeds to step S9 where it is judged whether the key switch 3 is turned into the ON state. The power saving state T3 continues until it is judged that the key switch 3 is turned into the ON state at step S9. When the operator turns the key switch 3 into the ON state for operating the vehicle or for repair and maintenance of the vehicle, the power saving state T3 is released to restart the operator detection by the seat switch 2. The process proceeds to step S10 where the seat switch anomaly judgment unit 4 shifts into an anomaly judgment deciding state T4 to turn on the lamp 7 or make the lamp 7 flash, thus notifying the anomaly of the seat switch 2 to the operator. In this case, the anomaly of the seat switch 2 is notified to the operator by the lamp 7 in conjunction with the ON action of the key switch 3. When the anomaly of the seat switch 2 is judged, the operator is frequently absent from the operator's seat. However, when another operator comes to the operator's seat to turn the key switch 3 into the ON state, the anomaly of the seat switch 2 is notified to another operator by the lamp 7.

Then, the process proceeds to step S11 where it is judged whether the seat switch 2 is turned into the OFF state. When the seat switch 2 is not turned into the OFF state, the process proceeds to step S12 where it is judged whether the key switch 3 is turned into the OFF state. When the key switch 3 is turned into the OFF state, the seat switch anomaly judgment unit 4 shifts into the anomaly provisional judgment state T2 again and the process returns to step S5.

When it is detected at step S2 that the key switch 3 is turned into the ON state, the seat switch anomaly judgment unit 4 shifts into an anomaly monitoring state T5 with the key switch 3 in the ON state. The process proceeds to step S13 where it is judged whether the key switch 3 is turned into the OFF state. When the key switch 3 is turned into the OFF state, the seat switch anomaly judgment unit 4 shifts into the anomaly monitoring state T1 and the process returns to step S1. In this case, counting to fifteen minutes at step S3 begins at a time when the key switch 3 is turned into the OFF state.

When the key switch 3 is not turned into the OFF state at step S13, the process proceeds to step S14 where it is judged whether the seat switch 2 is turned into the OFF state. When the seat switch 2 is turned into the OFF state, it is judged that the seat switch 2 operates to detect that the operator leaves the operator's seat. The process proceeds to step S15 where the seat switch anomaly judgment unit 4 shifts into a normality judgment state T6 to judge the seat switch 2 as normal. The process proceeds to step S16 where it is judged whether the key switch 3 is turned into the OFF state. When the key switch 3 is turned into the OFF state, the process proceeds to step S17 where the seat switch anomaly judgment unit 4 shifts into a power saving state T7 to stop the operator detection by the seat switch 2 while judging the seat switch 2 as normal. Thus, energy consumption is reduced.

The process proceeds to step S18 where it is judged whether the key switch 3 is turned into the ON state. The power saving state T7 continues until the key switch 3 is turned into the ON state by the operator. When it is judged that the key switch 3 is turned into the ON state at step S18, the power saving state T7 is released to restart the operator detection by the seat switch 2, Then, the seat switch anomaly judgment unit 4 shifts into the anomaly monitoring state T5 and the process returns to step S13.

When it is judged at step S11 that the seat switch 2 is turned into the OFF state, even though it is judged at step S10 that the seat switch 2 is anomalous, it is judged that the seat switch 2 operates to detect that the operator leaves the operator's seat. The process proceeds to step S15 and the seat switch anomaly judgment unit 4 shifts into the normality judgment state T6 to judge the seat switch 2 as normal. Accordingly, when the seat switch 2 is normal and the key switch 3 is not operated for a long time period with the operator seated on the operator's seat for some reason, the seat switch anomaly judgment unit 4 shifts from the anomaly monitoring state T1 into the anomaly provisional judgment state T2, further into the power saving state T3. When the key switch 3 is turned into the ON state subsequently, the seat switch anomaly judgment unit 4 shifts into the anomaly judgment deciding state T4 to turn on the lamp 7 or make the lamp 7 flash. However, when the operator stands up to turn the seat switch 2 into the OFF state, the process proceeds from step S11 to step S15, so that the seat switch anomaly judgment unit 4 shifts into the normality judgment state T6, and the vehicle can normally be operated.

When it is judged at step S1 or step S5 that the seat switch 2 is turned into the OFF state, it is judged that the seat switch 2 operates to detect that the operator leaves the operator's seat. The process proceeds to step S17, the seat switch 2 is judged as normal and the seat switch anomaly judgment unit 4 shifts into the power saving state T7. When it is judged at step S6 that the key switch 3 is turned into the ON state, the process proceeds to step S10 where the seat switch anomaly judgment unit 4 shifts into an anomaly judgment deciding state T4 to turn on the lamp 7 or make the lamp 7 flash.

The seat switch anomaly judgment unit 4 stores in the memory unit 5 contents of the anomaly at the anomaly provisional judgment state T2, the power saving state T3 and the anomaly judgment deciding state T4, in all of which the seat switch 2 is judged as anomalous. The stored contents of the anomaly in the memory unit 5 are confirmed by the analyzer 8 that is connected to the anomaly judgment apparatus 1. Thus, the anomalous state of the seat switch 2 can be known in detail, and therefore, the seat switch 2 can be restored or replaced with another one. To confirm the contents of the anomaly makes it possible to judge whether to use the seat switch 2 and the key switch 3 in an improper manner. Unwanted content stored in the memory unit 5 can be deleted by the analyzer 8.

According to the anomaly judge system of the first preferred embodiment, the normality/anomaly of the seat switch 2 as the operator detection device can be judged based on the ON-OFF state of the seat switch 2 and the ON-OFF state of the key switch 3. In the first preferred embodiment, a predetermined time period for judging the seat switch 2 as anomalous, that is, an elapsed time without turning the seat switch 2 into the OFF state and without turning the key switch 3 into the ON state is set at fifteen minutes. However, the predetermined time period is not limited to fifteen minutes and may be preferably adjusted in accordance with usage condition of the vehicle.

Figure 4:
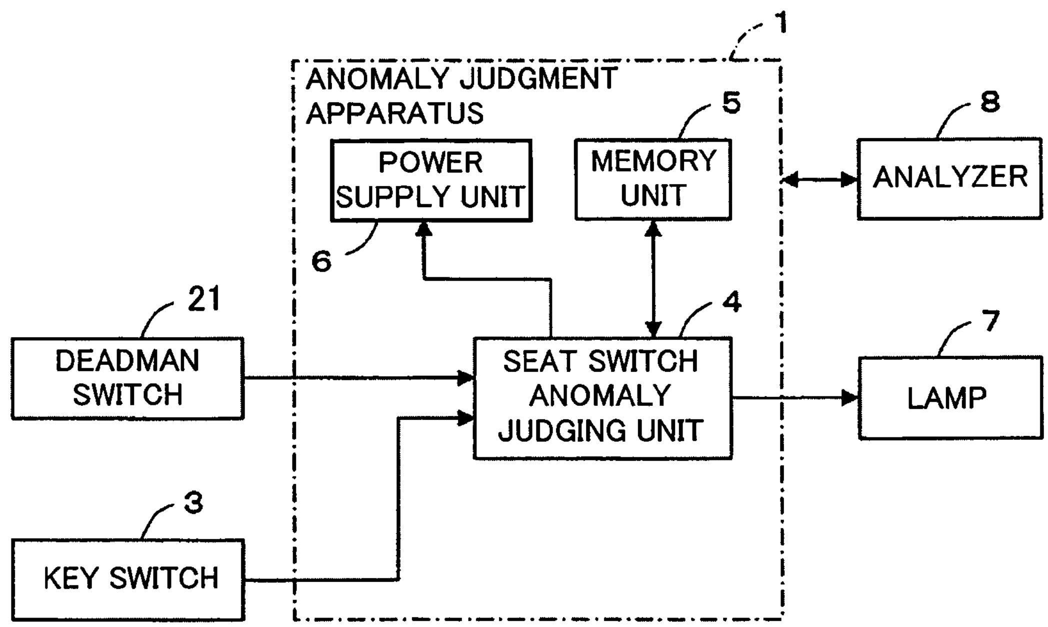
FIG. 4 is a block diagram of an anomaly judgment system for an operator detection device according to an alternative embodiment.
Figure 5:
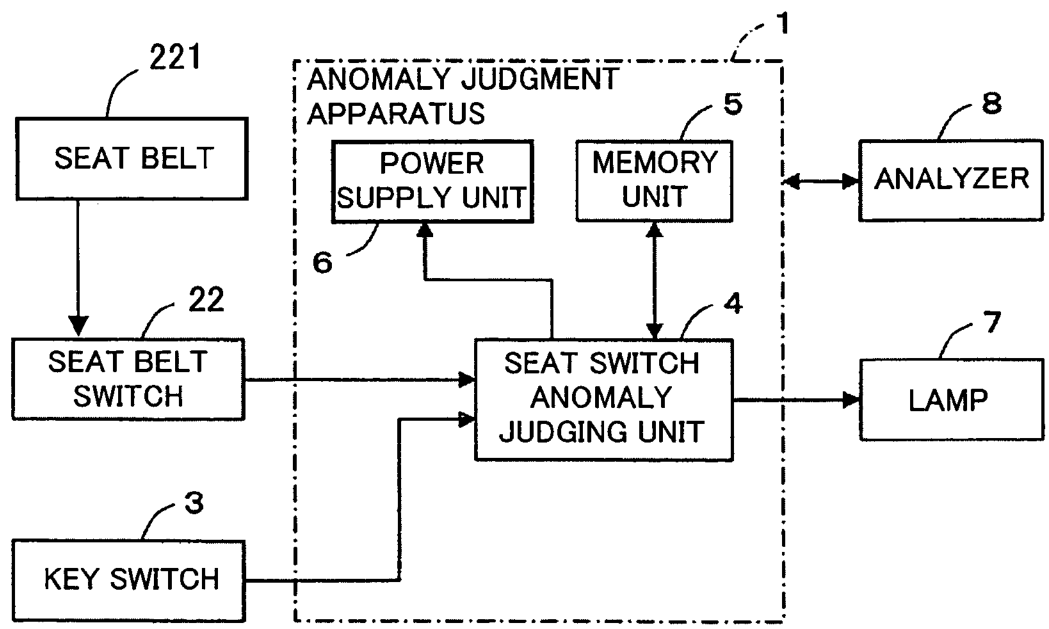
FIG. 5 is a block diagram of an anomaly judgment system for an operator detection device according to an alternative embodiment.
Figure 6:
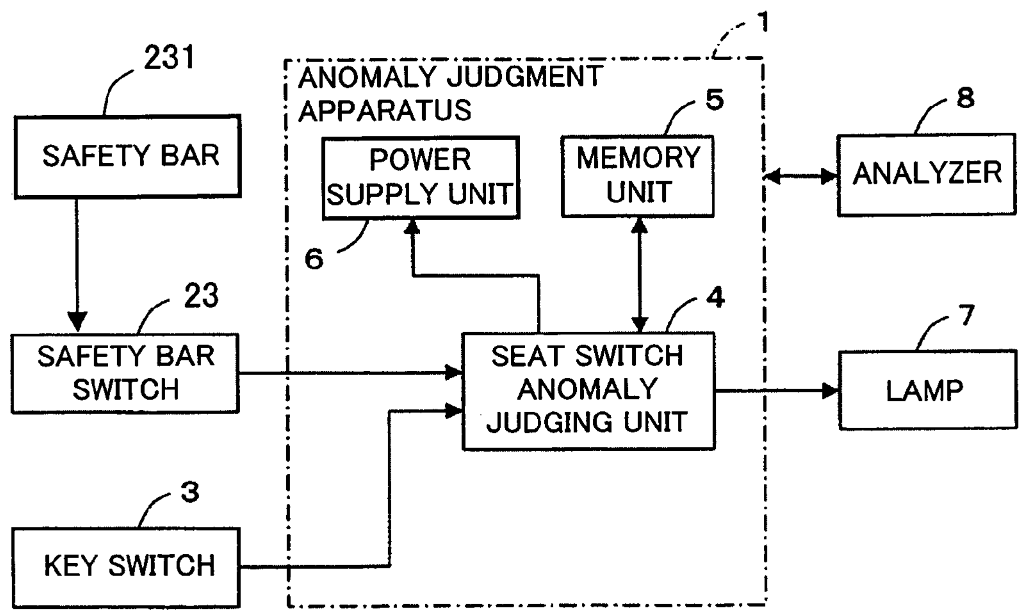
FIG. 6 is a block diagram of an anomaly judgment system for an operator detection device according to an alternative embodiment.

In the first preferred embodiment, the seat switch 2 is used as the operator detection device which is turned into the ON state when detecting presence of the operator. However, a deadman switch 21 that is normally operated when the operator operates the vehicle as shown in FIG. 4, a seat belt switch 22 linked with a seat belt 221 that is used by the operator seated on the operator's seat as shown in FIG. 5, or a safety bar switch 23 linked with a safety bar 231 that is closed when the operator is seated on the operator's seat as shown in FIG. 6 may be used as the operator detection device instead of the seat switch 2. Two or more of these switches may be used as the operator detection device, and presence of the operator is judged only when each operator detection device detects the operator. This makes it more reliable to detect the operator.

Figure 7:
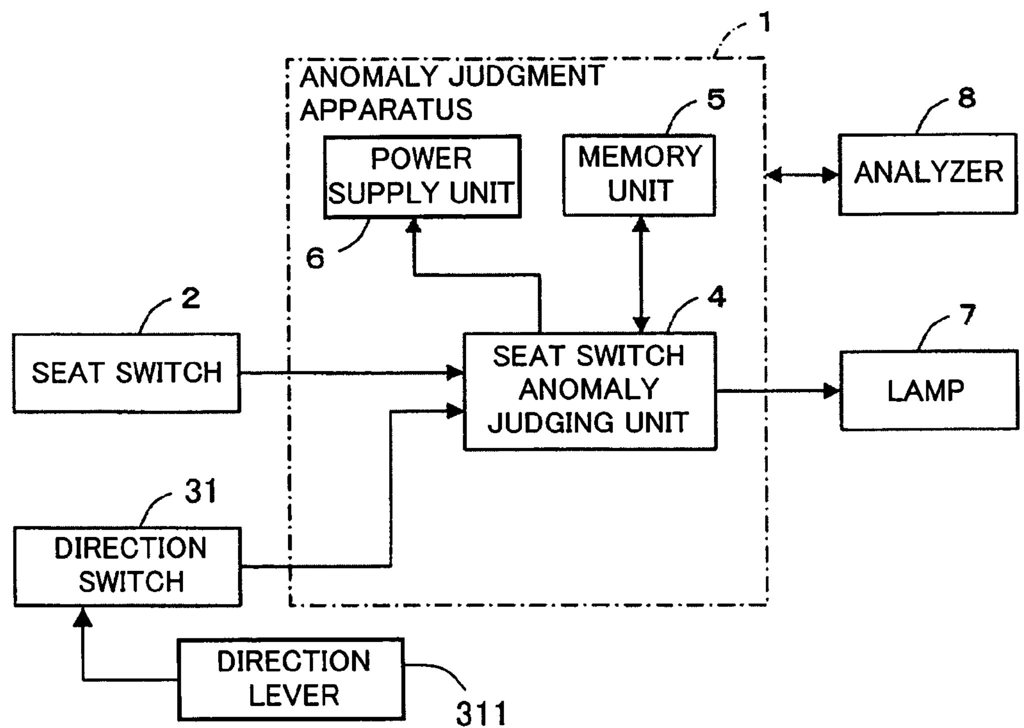
FIG. 7 is a block diagram of an anomaly judgment system for an operator detection device according to an alternative embodiment.
Figure 8:
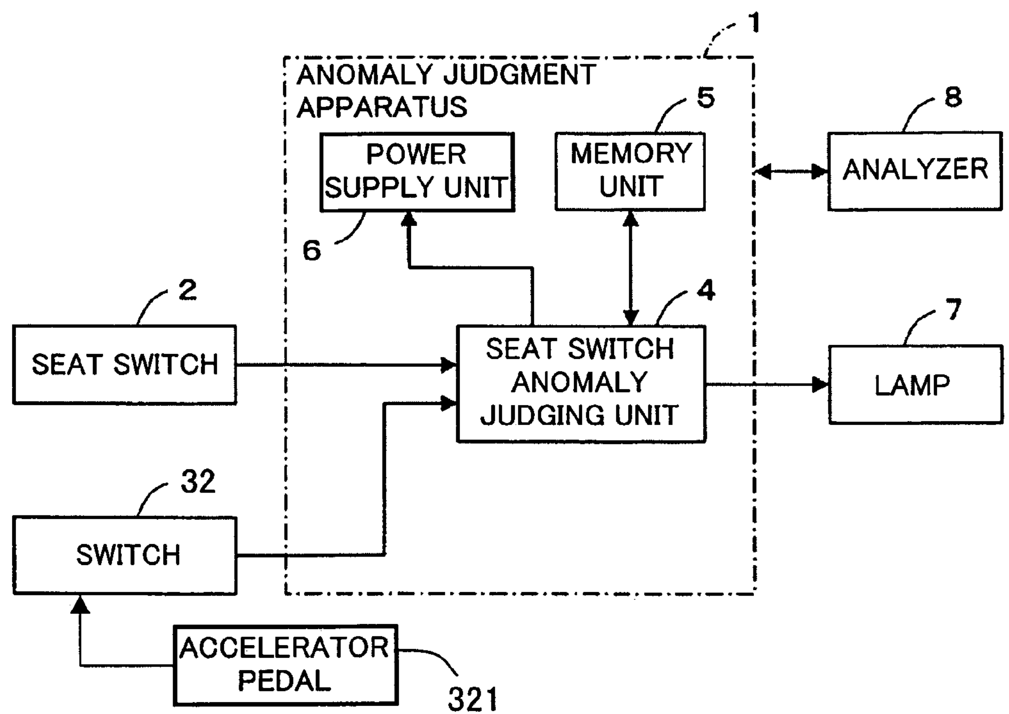
FIG. 8 is a block diagram of an anomaly judgment system for an operator detection device according to an alternative embodiment.
Figure 9:
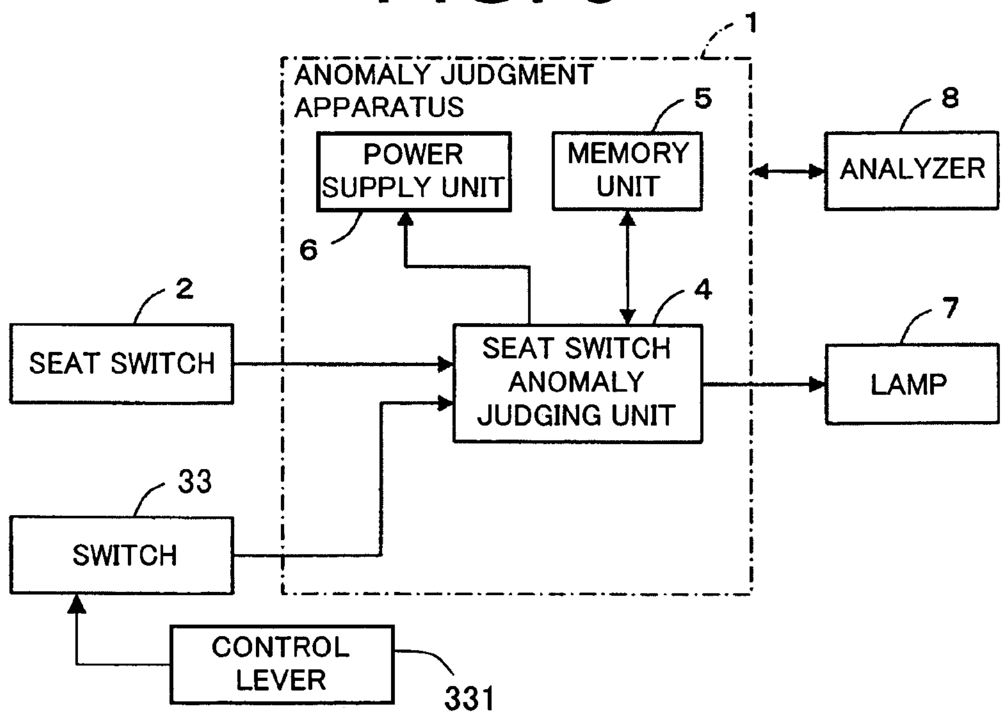
FIG. 9 is a block diagram of an anomaly judgment system for an operator detection device according to an alternative embodiment.
Figure 10:
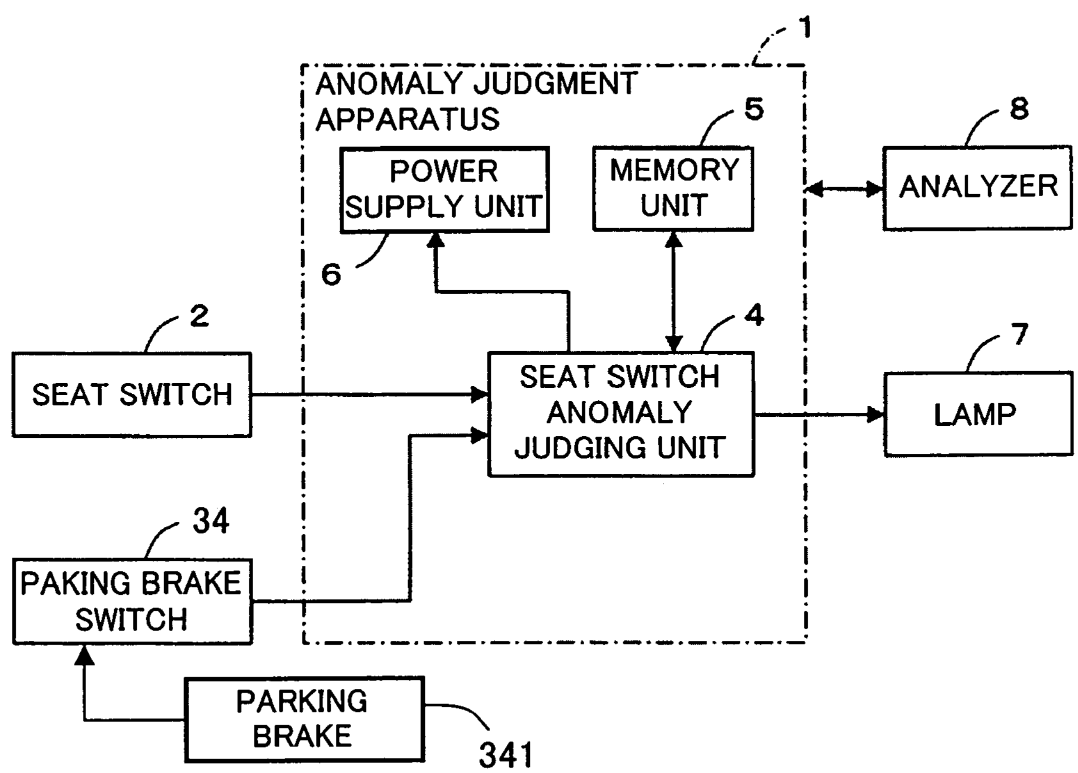
FIG. 10 is a block diagram of an anomaly judgment system for an operator detection device according to an alternative embodiment.

In the first preferred embodiment, the key switch 3 is used as the actuating switch which is operable to be turned into the ON state by the operator. However, a direction switch 31 linked with a direction lever 311 that determines the traveling direction of the vehicle as shown in FIG. 7, a switch 32 linked with an accelerator pedal 321 as shown in FIG. 8, a switch 33 linked with a control lever 331 for a loading apparatus as shown in FIG. 9, or a parking brake switch 34 linked with a parking brake 341 as shown in FIG. 10 is used as the actuating switch instead of the key switch 3. Meanwhile, one of the seat switch 2, the deadman switch 21, the seat belt switch 22 and the safety bar switch 23, all which are usable as the operator detection device, may be used as the actuating switch, and normality/anomaly of the operator detection device can be judged based on ON-OFF state of the actuating switch and ON-OFF state of the operator detection device. Furthermore, two or more of the above-mentioned switches may be used as the actuating switch, and normality/anomaly of the operator detection device can be judged based on ON-OFF state of these actuating switches as well as ON-OFF state of the operator detection device. This makes it more reliable to judge the anomaly of the operator detection device.

The lamp 7 is used as the notifying means in the first preferred embodiment, but the notifying means is not limited to it. Alternatively, a display device which uses sense of vision, a warning device such as buzzer and a speech output unit which uses sense of hearing, and a vibratory equipment which uses sense of touch may be used. Two or more of these notifying means may be used. This makes it possible to notify the anomaly of the operator detection device to the operator more clearly.

Figure 11:
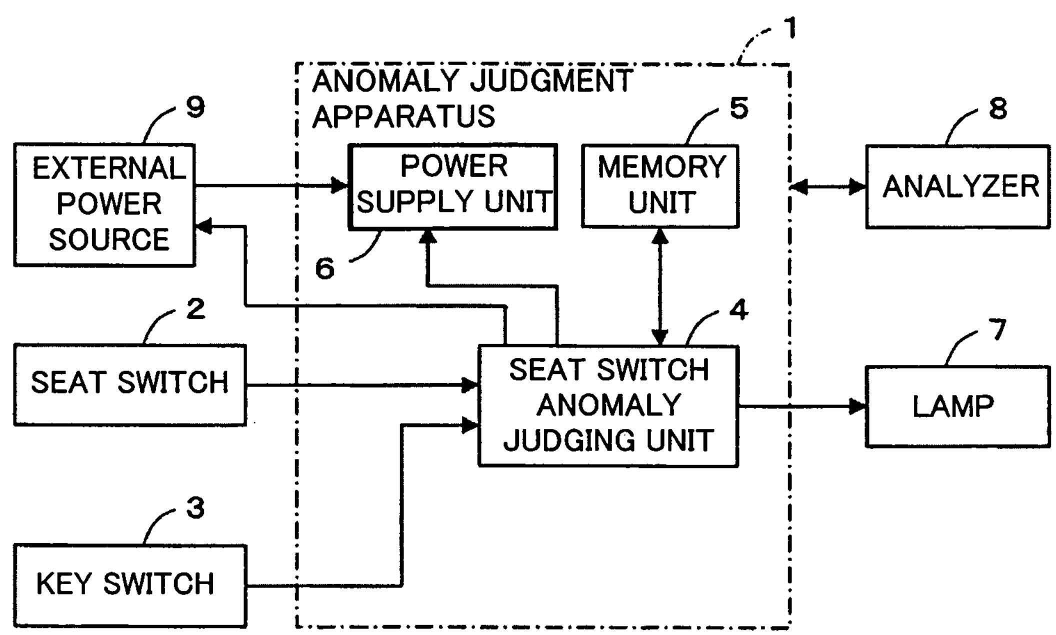
FIG. 11 is a block diagram of an anomaly judgment system for an operator detection device according to a second preferred embodiment.

The following will describe a second preferred embodiment with reference to FIG. 11 showing a construction of an anomaly judgment system for an operator detection device for use in an industrial vehicle. In the system, an external power source 9 using a DC-DC converter is connected to the power supply unit 6 of the anomaly judgment apparatus 1 of the first preferred embodiment as shown in FIG. 1. The seat switch anomaly judgment unit 4 of the anomaly judgment apparatus 1 is connected to the external power source 9. At the power saving state T3 or T7, the seat switch anomaly judgment unit 4 not only stops the operator detection by the seat switch 2 but also controls the external power source 9 to stop electric power supply from the external power source 9 to the power supply unit 6, thereby to reduce energy consumption. It is noted that the seat switch anomaly judgment unit 4 orders the external power source 9 to supply electric power to the power supply unit 6 when the power saving state T3 or T7 is released.

Figure 12:
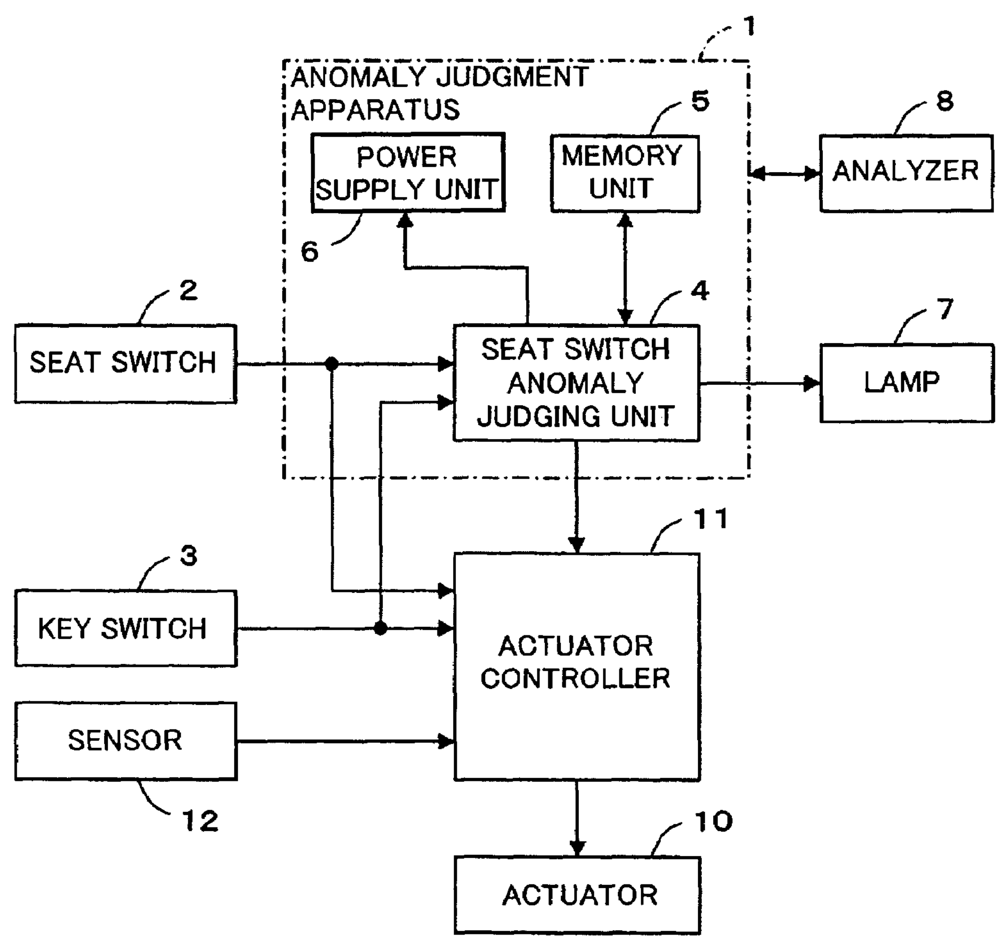
FIG. 12 is a block diagram of an anomaly judgment system for an operator detection device according to a third preferred embodiment.

The following will describe a third preferred embodiment with reference to FIG. 12 showing a construction of an anomaly judgment system for an operator detection device for use in an industrial vehicle. The anomaly judgment system includes an actuator 10 for inactivating an element of the vehicle when the operator is absent from the vehicle, and an actuator controller 11 connected to the actuator 10 for controlling the operation of the actuator 10. The actuator controller 11 is connected to the seat switch anomaly judgment unit 4 of the anomaly judgment apparatus 1. A sensor 12 is connected to the actuator controller 11 for controlling the operation of the actuator 10, and the seat switch 2 and the key switch 3 are also connected to the actuator controller 11.

As an example of the third preferred embodiment, an actuator for forcing a direction lever to return to a neutral position may be used as the actuator 10, and a direction switch may be used as the sensor 12. When the seat switch anomaly judgment unit 4 of the anomaly judgment apparatus 1 judges the seat switch 2 as anomalous, the seat switch anomaly judgment unit 4 transmits to the actuator controller 11 a signal that indicates the result of the judgment. The actuator controller 11 detects the current position of the direction lever based on a detection signal from the direction switch as the sensor 12. When the direction lever is in a forward position or a backward position, the actuator controller 11 activates the actuator 10 to forces the direction lever to return to the neutral position. This avoids wrong traveling of the vehicle when the seat switch 2 is judged as anomalous.

Besides the actuator for forcing the direction lever to return to the neutral position, a relay device for stopping power supply to a torque converter may be used as the actuator 10. Meanwhile, since the seat switch itself does not relate to basic function of the vehicle, it may be not preferable that the vehicle is stopped only because of the anomaly of the seat switch. In this view, a hydraulic valve for raising, lowering and stopping a loading apparatus may be used as the actuator 10. When the seat switch 2 is judged the seat switch 2 as anomalous, the hydraulic valve is operated to a stop position such that the loading apparatus is stopped from moving, thereby to prevent the loading apparatus from wrongly raising or lowering. Furthermore, an actuator for inactivating a function that does not relate to basic function of the vehicle may be used as the actuator 10.

The above-constructed anomaly judgment system of the present invention may be applied to an engine vehicle and a battery vehicle to precisely judge anomaly of an operator detection device.

Therefore, the present examples and embodiments are to be considered as illustrative and not restrictive and the invention is not to be limited to the details given herein but may be modified within the scope of the appended claims.

What is claimed is:

1. An anomaly judgment system for judging anomaly of an operator detection device that is turned into an ON state when detecting an operator in a vehicle, the anomaly judgment system comprising:

an actuating switch operable to be turned into an ON state by the operator; and an anomaly judgment unit that judges the operator detection device as anomalous when a time period during which the actuating switch is in an OFF state with the operator detection device in the ON state exceeds a predetermined time period.

2. The anomaly judgment system according to claim 1, wherein the anomaly judgment unit judges the operator detection device as normal when the operator detection device is turned into an OFF state.

3. The anomaly judgment system according to claim 2, wherein the anomaly judgment unit judges the operator detection device as normal when the operator detection device is turned into the OFF state even after the anomaly judgment unit judges the operator detection device as anomalous.

4. The anomaly judgment system according to claim 2, further comprising a power supply unit for supplying electric power to the anomaly judgment unit, wherein the anomaly judgment unit shifts into a power saving state to stop operator detection by the operator detection device when the anomaly judgment unit judges the operator detection device as normal or anomalous and the actuating switch is in the OFF state.

5. The anomaly judgment system according to claim 4, wherein the anomaly judgment unit releases the power saving state to restart the operator detection by the operator detection device when the actuating switch is turned into the ON state in the power saving state of the anomaly judgment unit.

6. The anomaly judgment system according to claim 4, further comprising an external power source connected to the power supply unit and the anomaly judgment unit.

7. The anomaly judgment system according to claim 1, further comprising a memory unit for storing a content of the anomaly therein when the anomaly judgment unit judges the operator detection device as anomalous.

8. The anomaly judgment system according to claim 7, further comprising an analyzer for confirming and deleting the stored content in the memory unit.

9. The anomaly judgment system according to claim 1, further comprising notifying means for notifying the anomaly of the operator detection device to the operator when the anomaly judgment unit judges the operator detection device as anomalous.

10. The anomaly judgment system according to claim 9, wherein the anomaly judgment unit notifies the anomaly of the operator detection device to the operator with the notifying means in conjunction with ON action of the actuating switch after judging the operator detection device as anomalous.

11. The anomaly judgment system according to claim 9, wherein the notifying means is a lamp.

12. The anomaly judgment system according to claim 1, further comprising:

an actuator for inactivating an element of the vehicle when the operator is absent from the vehicle; and an actuator controller for controlling operation of the actuator, wherein the anomaly judgment unit orders the actuator controller to activate the actuator when judging the operator detection device as anomalous, thereby to inactivate the element of the vehicle.

13. The anomaly judgment system according to claim 12, further comprising a sensor connected to the actuator controller.

14. The anomaly judgment system according to claim 1, wherein the operator detection device is a seat switch that detects that the operator is seated on an operator's seat, and the actuating switch is a key switch for starting the vehicle.

15. The anomaly judgment system according to claim 1, wherein the operator detection device is a deadman switch, a seat belt switch or a safety bar switch.

16. The anomaly judgment system according to claim 1, wherein the actuating switch is a direction switch, a switch linked with an accelerator pedal, a switch linked with a control lever or a parking brake switch.

17. A process for judging normality/anomaly of an operator detection device that is turned into an ON state when detecting an operator in a vehicle that includes an actuating switch operable to be turned into an ON state by the operator, the process comprising the steps of:

detecting the ON state of the operator detection device;

judging whether the operator detection device is turned into an OFF state;

judging whether the actuating switch is turned into the ON state;

judging whether a predetermined time period elapses without turning the operator detection device into the OFF state and without turning the actuating switch into an ON state since the detection of the ON state of the operator detection device; and judging the operator detection device as anomalous after the elapse of the predetermined time period.

18. The process according to claim 17, further comprising the step of judging the operator detection device as normal when it is judged that the operator detection device is turned into the OFF state.

19. The process according to claim 18, further comprising the step of judging the operator detection device as normal when it is judged that the operator detection device is turned into the OFF state even after judging the operator detection device as anomalous.

* * * * *

UNITED STATES PATENT AND TRADEMARK OFFICE

CERTIFICATE OF CORRECTION

PATENT NO. : 7,456,730 B2
APPLICATION NO. : 11/302588
DATED : November 25, 2008
INVENTOR(S) : Kazutoshi Yamada et al.

It is certified that error appears in the above-identified patent and that said Letters Patent is hereby corrected as shown below:

In the Specification

Column 1, line 28, please delete "confirming all of the following facts;" and insert therefore -- confirming all of the following facts: --;

Column 1, lines 31 and 38, please delete "from an outside of the vehicle" and insert therefore -- from outside of the vehicle --;

Column 2, lines 3-4, please delete "The process comprising the steps of;" and insert therefore -- The process comprising the steps of: --;

Column 2, line 67, please delete "vehicle such as forklift truck." and insert therefore -- vehicle such as a forklift truck. --;

Column 4, line 59, please delete "by the seat switch 2, Then, the seat switch anomaly" and insert therefore -- by the seat switch 2. Then, the seat switch anomaly --;

Column 5, line 39, please delete "According to the anomaly judge system" and insert therefore -- According to the anomaly judgment system --;

Column 7, line 1, please delete "actuator 10 to forces the direction lever to return" and insert therefore -- actuator 10 to force the direction lever to return --; and Column 7, lines 12-13, please delete "When the seat switch 2 is judged the seat switch 2 as anomalous," and insert therefore -- When the seat switch 2 is judged as anomalous, --.

Signed and Sealed this

Twenty-seventh Day of October, 2009

David J. Kappos

David J. Kappos
*Director of the United States Patent and Trademark Office*